(12) United States Patent
Lu et al.

(10) Patent No.: US 12,199,736 B2
(45) Date of Patent: Jan. 14, 2025

(54) EPHEMERIS INFORMATION-BASED SERVING CELL RESELECTION METHOD AND APPARATUS, AND STORAGE MEDIUM

(71) Applicant: GUANGDONG OPPO MOBILE TELECOMMUNICATIONS CORP., LTD., Guangdong (CN)

(72) Inventors: Qianxi Lu, Guangdong (CN); Xin You, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 366 days.

(21) Appl. No.: 17/713,227

(22) Filed: Apr. 4, 2022

(65) Prior Publication Data
US 2022/0232447 A1 Jul. 21, 2022

Related U.S. Application Data

(63) Continuation of application No. PCT/CN2019/110311, filed on Oct. 10, 2019.

(51) Int. Cl.
*H04B 7/185* (2006.01)
*H04W 36/08* (2009.01)
(Continued)

(52) U.S. Cl.
CPC ...... *H04B 7/18513* (2013.01); *H04W 36/083* (2023.05); *H04W 36/302* (2023.05); *H04W 36/322* (2023.05)

(58) Field of Classification Search
CPC ..... H04W 36/32; H04W 36/08; H04W 36/30; H04W 36/083; H04W 36/302;
(Continued)

(56) References Cited

U.S. PATENT DOCUMENTS

2014/0213259 A1* 7/2014 Teyeb ............... H04W 36/0094
455/436
2018/0176846 A1* 6/2018 Sundberg ............. H04W 36/30
(Continued)

FOREIGN PATENT DOCUMENTS

CN 102958123 3/2013
CN 104219718 12/2014
(Continued)

OTHER PUBLICATIONS

NEC, "Location based mobility enhancement," 3GPP TSG-RAN WG2 Meeting #107bis, R2-1912977, Oct. 2019.
(Continued)

*Primary Examiner* — Un C Cho
*Assistant Examiner* — Lalita W Pace
(74) *Attorney, Agent, or Firm* — Hodgson Russ LLP (57) ABSTRACT

A method for cell reselection based on ephemeris information includes: acquiring satellite ephemeris information, and determining at least one neighboring cell of a current serving cell based on the satellite ephemeris information; and selecting, in response to determining that the cell reselection needs to be performed, a target serving cell from the at least one neighboring cell for the cell reselection.

16 Claims, 2 Drawing Sheets

Acquire satellite ephemeris information, and determine, according to the satellite ephemeris information, at least one adjacent cell of the current serving cell — S10

When it is detected that serving cell reselection is required, select a target serving cell from the at least one adjacent cell, so as to perform cell reselection — S20

(51) Int. Cl.
*H04W 36/30* (2009.01)
*H04W 36/32* (2009.01)

(58) Field of Classification Search
CPC ... H04W 36/322; H04W 40/22; H04W 84/06; H04B 7/18513; H04L 45/851
See application file for complete search history.

(56) References Cited

U.S. PATENT DOCUMENTS

| | | | |
|---|---|---|---|
| 2019/0245614 A1 | 8/2019 | Lucky et al. | |
| 2022/0038964 A1* | 2/2022 | Wang | H04W 36/0061 |
| 2022/0159481 A1* | 5/2022 | Gao | H04W 36/0085 |

FOREIGN PATENT DOCUMENTS

| | | |
|---|---|---|
| CN | 108112281 | 6/2018 |
| CN | 110072264 | 7/2019 |
| EP | 0808034 | 11/1997 |

OTHER PUBLICATIONS

Interdigital Inc., "Report of Email Discussion [106# 73][NR/NTN] Mobility issues and solutions," 3GPP RAN WG2 Meeting #107, R2-1910961, Aug. 2019.
EPO, Extended European Search Report for EP Application No. 19948595.4, Aug. 4, 2022.
CATT, "Considerations on NTN mobility," 3GPP TSG-RAN WG3 #103, R3-190242, Mar. 2019.
ZTE Corporation et al., "Mobility management in NTN," 3GPP TSG-RAN WG2 Meeting#106, R2-1906265, May 2019.
WIPO, International Search Report and Written Opinion for PCT/CN2019/110311, Jul. 10, 2020.

* cited by examiner

EPHEMERIS INFORMATION-BASED SERVING CELL RESELECTION METHOD AND APPARATUS, AND STORAGE MEDIUM

CROSS-REFERENCE TO RELATED APPLICATION

This application is a continuation of International Application No. PCT/CN2019/110311, filed Oct. 10, 2019, the entire disclosure of which is incorporated herein by reference.

TECHNICAL FIELD

This application relates to the field of communication technology, and in particular to a method, an apparatus and a storage medium for cell reselection based on ephemeris information.

BACKGROUND

Currently, 3GPP is studying non-terrestrial network (NTN) technology, which generally provides communication services to ground users by means of satellite communication. Compared with terrestrial cellular network communication, satellite communication has many unique advantages. For example, every corner of the earth can be basically covered by satellite communication, the communication distance is long, and the increase in communication distance will not lead to a significant increase in communication costs. Moreover, the communication stability is high and not subject to natural disasters. Typically, communication satellites may be, depending on different heights of orbits, divided into low-earth orbit (LEO) satellites, medium-earth orbit (MEO) satellites, geostationary earth orbit (GEO) satellites, high elliptical orbit (HEO) satellites and the like.

In the NTN system, due to the high altitude of the satellite, for a user equipment (UE) located in the center of a cell and a UE located at the edge of the cell, a difference between their corresponding reference signal received powers (RSRPs) may be not obvious. If the RSRP-based handover mechanism in new radio (NR) system is still adopted, it may be difficult for the UE to distinguish whether it is located at the edge of its current serving cell before searching a neighboring cell with better channel quality than the current serving cell. Therefore, it may happen that the UE has left the original serving cell and enters another one, but fails to reselect a new cell for handover in time, thereby affecting the user experience.

SUMMARY

The application is mainly directed to provide a method, an apparatus and a storage medium for cell reselection based on ephemeris information, thereby enabling the UE to effectively perform cell reselection when the cell reselection is required, and avoiding unnecessary cell reselection.

To achieve the above objectives, the application provides a method for cell reselection based on ephemeris information, characterized in including:
  acquiring satellite ephemeris information, and determining at least one neighboring cell of a current serving cell based on the satellite ephemeris information; and
  selecting, in response to determining that the cell reselection needs to be performed, a target serving cell from the at least one neighboring cell for the cell reselection.

Optionally, before the acquiring the satellite ephemeris information, and determining the at least one neighboring cell of the current serving cell based on the satellite ephemeris information, the method further includes:
  receiving the satellite ephemeris information sent by a serving base station through a dedicated signaling or a system broadcast signaling; or
  reading the satellite ephemeris information as pre-saved out from a pre-configuration.

Optionally, the selecting, in response to determining that the cell reselection needs to be performed, the target serving cell from the at least one neighboring cell for the cell reselection includes:
  performing, in response to determining that the cell reselection needs to be performed, channel quality measurement on the at least one neighboring cell, and selecting the target serving cell from the at least one neighboring cell for cell reselection based on a measurement result.

Optionally, the selecting, in response to determining that the cell reselection needs to be performed, the target serving cell from the at least one neighboring cell for the cell reselection includes:
  performing, in response to determining that the cell reselection needs to be performed, channel quality measurement on the current serving cell to obtain first channel quality information;
  performing channel quality measurement on the at least one neighboring cell to obtain second channel quality information; and
  selecting, based on the first channel quality information and the second channel quality information, the target serving cell from the at least one neighboring cell for the cell reselection.

Optionally, the acquiring the satellite ephemeris information, and determining the at least one neighboring cell of the current serving cell based on the satellite ephemeris information includes:
  acquiring the satellite ephemeris information and current location information; and
  determining the at least one neighboring cell of the current serving cell based on the satellite ephemeris information and the current location information.

Optionally, the current location information includes: a related identifier of the current serving cell and/or a current location of a UE.

Optionally, the determining the at least one neighboring cell of the current serving cell based on the satellite ephemeris information and the current location information includes:
  determining, based on the satellite ephemeris information and the current location information, a target satellite currently providing communication services for the current serving cell; and
  determining the at least one neighboring cell of the current serving cell based on the target satellite and a mapping relationship between satellites and cell identifiers.

Optionally, the determining, based on the satellite ephemeris information and the current location information, the target satellite currently providing communication services for the current serving cell includes:
  determining a satellite ground station corresponding to the current serving cell based on the current location information; and determining the target satellite currently associated with the satellite ground station based on the satellite ground station and the satellite ephemeris information.

Optionally, before the determining the at least one neighboring cell of the current serving cell based on the target satellite and the mapping relationship between satellites and cell identifiers, the method further includes:

acquiring a satellite type of the target satellite, wherein the satellite type includes a first satellite type and a second satellite type.

Optionally, after the acquiring the satellite type of the target satellite, the method further includes:

performing, in response to detecting that the satellite type is the first satellite type, the determining the at least one neighboring cell of the current serving cell based on the target satellite and the mapping relationship between satellites and cell identifiers.

Optionally, after the acquiring the satellite type of the target satellite, the method further includes:

determining, in response to detecting that the satellite type is the second satellite type, a satellite ground station corresponding to the current serving cell based on the current location information; and the determining the at least one neighboring cell of the current serving cell based on the target satellite and the mapping relationship between satellites and cell identifiers includes:

determining a satellite associated with the satellite ground station based on the satellite ground station and the satellite ephemeris information; and determining the at least one neighboring cell of the current serving cell based on the satellite associated with the satellite ground station and the mapping relationship between satellites and cell identifiers.

Optionally, before the selecting, in response to determining that the cell reselection needs to be performed, the target serving cell from the at least one neighboring cell for the cell reselection, the method further includes:

calculating a distance from a center position of the current serving cell based on the current location information; and determining whether the cell reselection needs to be performed based on the distance.

Optionally, the determining whether the cell reselection needs to be performed based on the distance includes:

determining the distance as a first distance;

calculating a second distance from a center position of the at least one neighboring cell based on the current location information; and determining whether the cell reselection needs to be performed based on the first distance and the second distance.

Optionally, the determining whether the cell reselection needs to be performed based on the first distance and the second distance includes:

calculating a difference between the first distance and the second distance; and determining whether the cell reselection needs to be performed based on the difference.

Optionally, the determining whether the cell reselection needs to be performed based on the difference includes:

starting, in response to determining that the difference exceeds a first threshold, a timing with a current time as a timing starting point, and determining, based on a result of the timing, whether a duration of the difference exceeding the first threshold is greater than a preset duration;

if yes, detecting whether a difference changing value corresponding to the difference within the duration is greater than a second threshold; and determining, in response to detecting that the difference changing value is greater than the second threshold, the cell reselection needs to be performed.

In addition, embodiments of the application further provides an apparatus for cell reselection based on ephemeris information, including a memory, a processor, and a program for cell reselection based on ephemeris information, wherein the program is stored in the memory, executable on the processor, and used for, when being executed by the processor, implementing the method for cell reselection based on ephemeris information as described above.

In addition, embodiments of the application further provides a computer-readable storage medium, storing thereon a program for cell reselection based on ephemeris information, wherein the program is used for, when being executed by a processor, implementing the method for cell reselection based on ephemeris information as described above.

In the method, apparatus and storage medium for cell reselection based on ephemeris information according to the embodiments of the application, the satellite ephemeris information is acquired, and at least one neighboring cell of the current serving cell is determined according to the satellite ephemeris information; when the cell reselection is required, a target serving cell is selected from the at least one neighboring cell for cell reselection. According to the above solution, the satellite ephemeris information is used to accurately calculate, predict, describe, and track the operating status, such as time, position, and speed, of the satellite/flying object, so as to determine the satellite that currently or subsequently provides services for the serving cell, thereby further determining at least one neighboring cell of the current serving cell. Even when the satellite moves at a high speed and the network topology changes rapidly, it can ensure that, when the UE needs to perform cell reselection, the cell reselected from the neighboring cells can be reselected for effectively providing desirable communication services for the UE while avoiding unnecessary cell reselection.

The implementation, functional characteristics, and advantages of the application will be further described in conjunction with the embodiments and with reference to the accompanying drawings.

DETAILED DESCRIPTION

It should be understood that the specific embodiments described here are only used to explain the application, rather than limiting the application.

According to a solution of embodiments of the application, the satellite ephemeris information is acquired, and at least one neighboring cell of the current serving cell is determined according to the satellite ephemeris information; when the cell reselection is required, a target serving cell is selected from the at least one neighboring cell for cell reselection. According to the above solution, the satellite ephemeris information is used to accurately calculate, predict, describe, and track the operating status, such as time, position, and speed, of the satellite/flying object, so as to determine the satellite that currently or subsequently provides services for the serving cell, thereby further determining at least one neighboring cell of the current serving cell. Even when the satellite moves at a high speed and the network topology changes rapidly, it can ensure that, when the UE needs to perform cell reselection, the cell reselected from the neighboring cells can be reselected for effectively providing desirable communication services for the UE while avoiding unnecessary cell reselection.

The main technical terms involved in the embodiments of this application include following terms.

UE (user equipment) is an important concept in mobile communications. In 3G, 4G and 5G networks, user terminals may be referred to as UEs.

LEO (low-earth orbit) satellite has an altitude range of 500 km to 1500 km, and a corresponding orbit period of about 1.5 hours to 2 hours. The signal propagation delay of single-hop communication between users is generally less than 20 ms. The maximum visible time of the satellite is 20 minutes. The signal propagation distance is short, the link loss is small, and the requirement for the transmission power of the user terminal is not high.

RSRP (reference signal receiving power) is one of key parameters and physical layer measurement requirements that can represent the strength of the wireless signal in the in LTE (long-term evolution) network, and is the average value of the signal power received on all resource particles that carry the reference signal in a certain symbol.

RSRQ (reference signal receiving quality) is mainly used for sorting different LTE candidate cells based on the signal quality.

The "near-far effect" in the NR system refers to such an effect that, when the UE is in the center of the cell, the RSRP is significantly higher than the RSRP when it is at the edge of the cell. When the UE moves to the edge of the cell, the signal quality of the serving cell deteriorates and the signal quality of the neighboring cell becomes better.

TLE (two-line orbital element), also known as satellite ephemeris, is an expression used for describing the position and velocity of spacecraft, that is, a two-line orbital data system. The satellite ephemeris is used for determining time, coordinates, azimuth, speed and other parameters of a flying body through mathematical relationship between six orbital parameters of Kepler's law. It has extremely high precision and can be used to accurately calculate, predict, describe, and track the time, position and speed of satellites and flying objects, and represent precise parameters of flying objects such as celestial bodies, satellites, spacecraft, missiles, and space junk. It can be considered as placing a flying object in a three-dimensional space and using time to three-dimensionally depict past, present and future of celestial bodies. The time of the satellite ephemeris may be calculated based on CUT (coordinated universal time). The satellite ephemeris information can be shown in Table 1 below.

TABLE 1

Satellite Ephemeris

| Column | Description |
| --- | --- |
| 1 | Line Number of Element Data |
| 03-07 | Satellite Number |
| 8 | Classification (U = Unclassified) |
| 10-11 | International Designator (Last two digits of launch year) |
| 12-14 | International Designator (Launch number of the year) |
| 15-17 | International Designator (Piece of the launch) |
| 19-20 | Epoch Year (Last two digits of year) |
| 21-32 | Epoch (Day of the year and fractional portion of the day) |
| 34-43 | First Time Derivative of the Mean Motion |
| 45-52 | Second Time Derivative of Mean Motion (decimal point assumed) |
| 54-61 | BSTAR drag term (decimal point assumed) |
| 63 | Ephemeris type |
| 65-68 | Element number |
| 69 | Checksum (modulo 10) |
| 1 | Line Number of Element Data |
| 03-07 | Satellite Number |
| 09-16 | Inclination (degrees) |
| 18-25 | Right Ascension of the Ascending Node (degrees) |
| 27-33 | Eccentricity (decimal point assumed) |
| 35-42 | Argument of Perigee (degrees) |
| 44-51 | Mean Anomaly (degrees) |
| 53-63 | Mean Motion (perigees per day) |
| 64-68 | Revolution number at epoch (revs) |
| 69 | Checksum (modulo 10) |

The solution of embodiments of the application is proposed in view of follows. In the related art, when reselecting the serving cell of the user terminal, the "near-far effect" in the NR system is usually considered, and then mobility management is performed based on the UE's signal quality measurement of the cell. In other words, the UE can determine whether it has moved to the edge of the cell through RSRP measurement, so as to prepare for cell reselection.

However, in non-terrestrial communication network systems, due to the great height of satellite, the difference in RSRP corresponding to the UE in the center of the cell and the UE at the edge of the cell is not obvious. If the typical handover mechanism based on RSRP measurement is used, it is difficult for the UE to distinguish whether it is at the edge of the cell through RSRP measurement, and it is also difficult to find neighboring cells with better channel quality than the current serving cell through RSRP measurement. Therefore, such a situation may occur that the UE has left the original serving cell and enters another cell, but there is no reselection to a new cell in time, thereby affecting user experience.

In view of above, the embodiments of the application propose a solution that utilizes the characteristics of satellite ephemeris information to determine, based on the satellite ephemeris information, a satellite that currently or subsequently provides services for the serving cell even when the satellite height is great and the moving speed is fast, so as to further determine at least one neighboring cell of the current serving cell. Accordingly, when the user terminal needs to perform cell reselection, the cell reselected from the neighboring cells can effectively provide the user terminal with better communication service, thereby avoiding unnecessary cell reselection.

Figure 1:
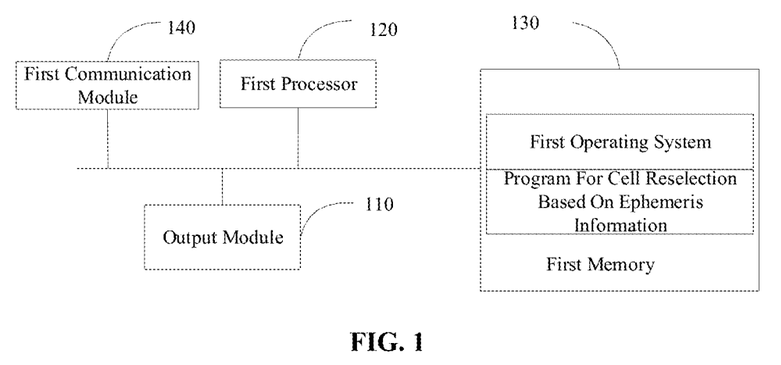
FIG. 1 is a block diagram of the apparatus for cell reselection based on ephemeris information according to some embodiments of the application.

Specifically, referring to FIG. 1, FIG. 1 is a block diagram of an apparatus for cell reselection based on ephemeris information according to some embodiments of the application. The apparatus for cell reselection based on ephemeris information may be an apparatus that is independent of the mobile terminal and capable of data processing, and may be carried on the mobile terminal in the form of hardware or software.

In some embodiments, the apparatus for cell reselection based on ephemeris information at least includes an output module 110, a first processor 120, a first memory 130, and a first communication module 140.

The first memory 130 stores a first operating system and a program for cell reselection based on ephemeris information. The apparatus for cell reselection based on ephemeris information may obtain satellite ephemeris information and store it in the first memory 130. The output module 110 may be a display screen, a speaker, and the like, and the display screen may display relevant interface information of the user terminal. The first communication module 140 may include a WIFI module, a mobile communication module, and a Bluetooth module, and may communicate with serving base stations in a terrestrial NR system and an NTN system through the first communication module 140.

In some embodiments, the program for cell reselection based on ephemeris information in the first memory 130 is executed by the processor to implement the following steps:

acquiring satellite ephemeris information, and determining at least one neighboring cell of a current serving cell based on the satellite ephemeris information; and selecting, in response to determining that the cell reselection needs to be performed, a target serving cell from the at least one neighboring cell for the cell reselection.

According to the embodiments of the application, the satellite ephemeris information is acquired, and at least one neighboring cell of the current serving cell is determined according to the satellite ephemeris information; when the cell reselection is required, a target serving cell is selected from the at least one neighboring cell for cell reselection. According to the above solution, the satellite ephemeris information is used to accurately calculate, predict, describe, and track the operating status, such as time, position, and speed, of the satellite/flying object, so as to determine the satellite that currently or subsequently provides services for the serving cell, thereby further determining at least one neighboring cell of the current serving cell. Even when the satellite moves at a high speed and the network topology changes rapidly, it can ensure that, when the UE needs to perform cell reselection, the cell reselected from the neighboring cells can be reselected for effectively providing desirable communication services for the UE while avoiding unnecessary cell reselection.

Based on the foregoing apparatus architecture, embodiments of the method of the application is proposed as follows.

Figure 2:
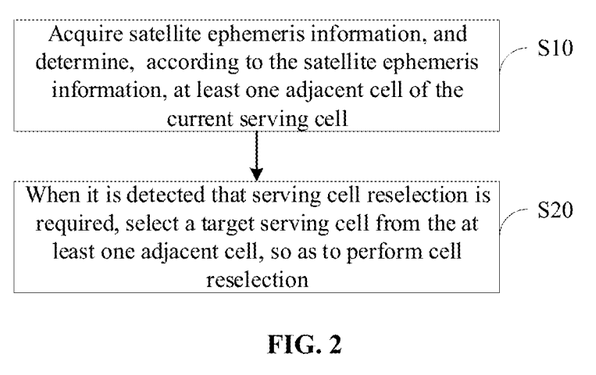
FIG. 2 is a schematic flowchart of the method for cell reselection based on ephemeris information according to some embodiments of the application.

Referring to FIG. 2, FIG. 2 is a schematic flowchart of the method for cell reselection based on ephemeris information according to some embodiments of the application. In some embodiments, the method for cell reselection based on ephemeris information includes the following steps S10 to S20.

In step S10, satellite ephemeris information is acquired, and at least one neighboring cell of the current serving cell is determined according to the satellite ephemeris information.

The method in some embodiments is applied to a user terminal, and the execution subject of the method may be the user terminal, or the apparatus for cell reselection based on ephemeris information carried on the user terminal. The user terminal is taken in the embodiments as an example. In some embodiments, the user terminal may be a mobile device such as a mobile phone and a tablet computer.

Herein, the satellite ephemeris contained in the satellite ephemeris information shown in Table 1 above is divided into two lines. The first line (not shown) is usually regarded as the 0th line, which is the common name of the satellite, and the maximum length thereof is 24 characters. The 1st line and 2nd line (shown in Table 1) are in the standard format of satellite ephemeris. Satellite ephemeris information can be used to accurately calculate and predict operating state parameters of the satellite such as time, position, speed and the like.

In addition, the satellite ephemeris information in some embodiments also includes a mapping relationship between cell identifiers of serving cells and (information of) satellites, and each satellite in the mapping relationship corresponds to at least one cell identifier of the cell served by the satellite.

According to some embodiments, the satellite ephemeris information, such as satellite movement trajectory, movement position, movement time and other information, is utilized to derive the current satellite or the next satellite that provides communication services for the current serving cell, thereby determining at least one neighboring cell of the current serving cell.

In some embodiments, the satellite ephemeris information in the embodiments may be obtained by the user terminal from a serving base station corresponding to the current serving cell, or may be sent by the serving base station to the user terminal through dedicated signaling transmission or wireless system broadcast signaling transmission.

Considering that the serving base station may have poor service signal and high network delay in some specific scenarios, if the satellite ephemeris information (data packet) that needs to be sent to the user terminal is too heavy, dedicated signaling transmission or wireless system broadcast signaling transmission may consume a long transmission time, which is not conducive to the reselection of the serving cell.

Accordingly, the satellite ephemeris information that needs to be used may be saved in advance in a pre-configuration (e.g., a SIM card or other memory) of the user terminal, so that when the user terminal detects that the service cell needs to be reselected, it can directly retrieve the satellite ephemeris information from the terminal.

Specifically, before performing this step, the user terminal may receive the satellite ephemeris information sent by the serving base station through dedicated signaling transmission or system broadcast signaling transmission. Alternatively, the user terminal may read the pre-saved satellite ephemeris information from the pre-configuration. Then the user terminal derives the satellite that will provide network communication services for the current serving cell based on the satellite ephemeris information, and then determines at least one neighboring cell based on the derived satellite.

In step S20, when it is detected that the cell reselection needs to be performed, a target serving cell is selected from the at least one neighboring cell for cell reselection.

Generally, when the user terminal is far away from the center of the cell, the communication service provided by the current serving cell for the user terminal will get worse and worse, and the corresponding RSRP will also decrease, resulting in the deterioration of the signal quality of the user terminal. According to related criteria of cell reselection, when any one of the events A3 and A5 is triggered by the signal of the serving cell, the user terminal will perform the reselection of the serving cell.

Herein, the event A3 refers to that the service quality RSRP of the neighboring cell is higher than the current serving cell by an absolute threshold; and the event A5 refers to that the service quality RSRP of the current serving cell is lower than an absolute threshold, and the service quality RSRP of the neighboring cell is higher than another absolute threshold.

The above-mentioned events A3 and A5 reselection mechanism based on RSRP measurement may cause a certain lag in cell reselection, for example, the user terminal has left the original serving cell and entered another cell, but failed to reselect a new cell in time. In order to avoid this situation, the user terminal according to some embodiments may further detect under which conditions the serving cell reselection is required before performing the reselection of the serving cell.

Specifically, the user terminal may first calculate the distance between the current position of the user terminal and the center position of the cell, and then determine whether the serving cell needs to be reselected according to the distance.

It is understandable that for each serving cell, the signal quality at the center of the cell in the NTN system is often the strongest, and the signal quality at the edge of the cell is often the weakest. Therefore, a coverage area may be determined while taking the cell center position as the circle center of the satellite signal coverage, and taking the farthest coverage distance as the radius. When the user terminal is in the coverage area, the cell reselection operation is not triggered; on the contrary, once the user terminal leaves or is about to leave the coverage area, the cell reselection operation will be triggered immediately.

When whether the serving cell reselection is required is determined based on only the distance between the terminal position and the cell center position, such a situation may occur that, when a user terminal is close to the edge of current cell (that is, the distance is close to the coverage radius), the RSRP is already weak. In order to prevent the user terminal from triggering the cell reselection operation only when the distance from the center of the cell exceeds the coverage radius, the cell reselection process may also be optimized according to the distance between the user terminal and other neighboring cells.

A specific implementation may be as follows.

The user terminal uses the above-mentioned distance as a first distance; calculates a second distance from the center position of the at least one neighboring cell; and then determines whether the cell resection needs to be performed according to the first distance and the second distance.

Specifically, after calculating the first distance from the center position of the current cell, the user terminal may continue to calculate the second distance from the center position of the at least one neighboring cell, and then determines whether the cell resection needs to be performed according to the first distance and the second distance.

For example, a difference between the first distance and the second distance is obtained by subtracting the second distance from the first distance, and is then compared with a preset threshold, and then it is determined whether the cell reselection needs to be performed according to the comparison result.

The specific setting of the threshold may be implemented according to the RSRP of the cell. For example, the distance between the position where the RSRP is sufficient to provide normal communication services for the user terminal and the center of the signal coverage in the current serving cell may be used as the threshold. When the difference is greater than the threshold, it is determined that the cell reselection needs to be performed. Otherwise, it is determined that the cell reselection is not required.

Further, in order to achieve an accurate judgment on whether the serving cell needs to be reselected, after the difference between the first distance and the second distance is calculated, when it is detected that the difference exceeds the first threshold, a timing is started with the current time point serving as the timing starting point. Then it is detected whether the duration of the difference exceeding the first threshold is greater than a preset duration based on the timing result. If yes, it is further detected whether a difference change amount within the duration corresponding to the difference is greater than a second threshold. When the difference change amount is greater than the second threshold, it is determined that the cell reselection is required.

For example, the user terminal calculates the first distance d1 between itself and the ground center position of the current serving cell, and at the same time calculates the second distance d2 between itself and the ground center position of the neighboring cell. At time T1, if the user terminal detects that the difference (i.e. d1−d2) between d1 and d2 is greater than the first threshold dth1. At this time, time T1 is used as the timing starting point. If the user terminal detects that the duration (T2−T1) of d1−d2>dth1 exceeds the preset duration, it is further detected whether the change amount corresponding to the difference d1−d2 within the duration T2−T1 is greater than dth2. If the change amount is greater than dth2, it is determined that the serving cell needs to be reselected.

Specifically, when the user terminal determines that the serving cell needs to be reselected, it may randomly select a target serving cell from neighboring cells for cell reselection.

In some embodiments, when the user terminal determines that the serving cell needs to be reselected, it may perform channel quality measurement on the at least one neighboring cell, and select the target serving cell for cell reselection from the at least one neighboring cell according to the measurement result.

In some embodiments, the channel quality measurement is to collect the channel quality information of the cell. The channel quality information in some embodiments may include RSRP and/or RSRQ.

Further, the user terminal may also obtain the RSRP and/or RSRQ of at least one neighboring cell when it determines that the serving cell needs to be reselected, and then randomly select the target serving cell for cell reselection from the neighboring cells according to the RSRP and/or RSRQ.

Further, the user terminal may also obtain the RSRP and/or RSRQ of at least one neighboring cell when it determines that the serving cell needs to be reselected, and then select a cell with the highest RSRP and/or highest RSRQ from the neighboring cells according to the RSRP and/or RSRQ as the target serving cell for handover.

In some embodiments, in order to directly select a target neighboring cell during the cell reselection, the following solution may be adopted in some embodiments.

In some other embodiments, when the user terminal determines that the serving cell needs to be reselected, it performs channel quality measurement on the serving cell to obtain first channel quality information; performs channel quality measurement on the at least one neighboring cell to obtain second channel quality information; and selects, according to the first channel quality information and the second channel quality information, the target serving cell from the at least one neighboring cell for cell reselection.

For example, the first channel quality information of the current serving cell is: RSRP=−85 dBm, RSRQ=−10; the second channel quality information of neighboring cell 1 is: RSRP=−95 dBm, RSRQ=−8; the second channel quality information of neighboring cell 2 is: RSRP=−65 dBm, RSRQ=−12; and the second channel quality information of neighboring cell 3 is: RSRP=−75 dBm, RSRQ=−9.

At this time, if RSRP is used as the cell reselection criterion, the neighbor cell 2 with the largest RSRP can be determined as the target neighbor cell for handover. If RSRQ is used as the cell reselection criterion, the neighbor cell 1 with the largest RSRQ can be determined as the target neighbor cell for handover. If both RSRP and RSRQ are used as the cell reselection criteria, the neighbor cell 3 with the largest RSRP and the largest RSRQ can be determined as the target neighbor cell for handover.

According to the above-described solution of embodiments of the application, the satellite ephemeris information is acquired, and at least one neighboring cell of the current serving cell is determined according to the satellite ephemeris information; when the cell reselection is required, a target serving cell is selected from the at least one neighboring cell for cell reselection. According to the above solution, the satellite ephemeris information is used to accurately calculate, predict, describe, and track the operating status, such as time, position, and speed, of the satellite/flying object, so as to determine the satellite that currently or subsequently provides services for the serving cell, thereby further determining at least one neighboring cell of the current serving cell. Even when the satellite moves at a high speed and the network topology changes rapidly, it can ensure that, when the UE needs to perform cell reselection, the cell reselected from the neighboring cells can be reselected for effectively providing desirable communication services for the UE while avoiding unnecessary cell reselection.

Figure 3:
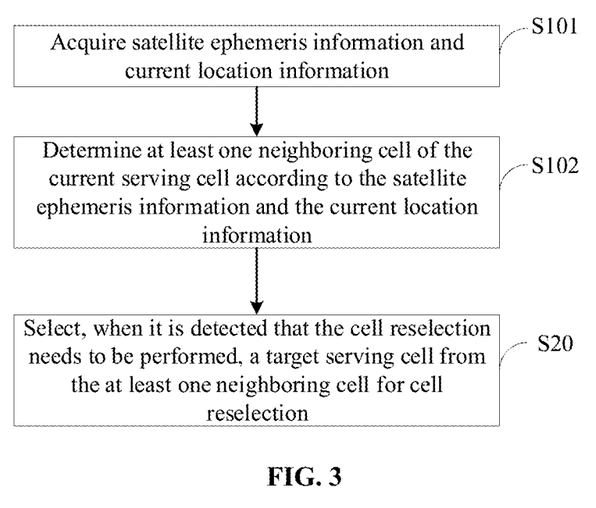
FIG. 3 is a schematic flowchart of the method for cell reselection based on ephemeris information according to some other embodiments of the application.

Referring to FIG. 3, FIG. 3 is a schematic flowchart of the method for cell reselection based on ephemeris information according to some other embodiments of the application. As shown in FIG. 3, the embodiments are based on the embodiments shown in FIG. 2, and the above step S10 may specifically include following steps S101 to S102.

In step S101, satellite ephemeris information and current location information are acquired.

In some embodiments, the current location information may include information that represents the location of the user terminal, for example, geographic address information, latitude and longitude information, and the like. For geographic address information and longitude/attitude information, the user terminal can acquire them by positioning based on a built-in positioning module. For example, a global positioning system (GPS) technology may be utilized to achieve positioning.

In addition, various location information of the user terminal that can be used to represent or determine the current geographic location or network location of the user terminal in practical applications can be used as the current location information of the user terminal. For example, in some embodiments, the current location information may also include IP (Internet Protocol) address information of the network to which the user terminal is connected. The current location information may also include PCI (physical cell identifier), ECGI (Evolved universal terrestrial radio access network Cell Global Identifier) and other relevant identification information of the current serving cell where the user terminal is located.

In some embodiments, the current location information may include: a related identifier of the current serving cell and/or a current location of the user terminal. In some embodiments, the related identifier of the current serving cell may include PCI or ECGI, and the current location of the user terminal may include the geographic address, IP address, latitude and longitude of the user terminal.

In step S102, at least one neighboring cell of the current serving cell is determined according to the satellite ephemeris information and the current location information.

After acquiring the satellite ephemeris information and current location information, the user terminal can determine at least one neighboring cell of the current serving cell based on these two types of information.

In some embodiments, the satellite ephemeris information includes the satellite ephemeris corresponding to different satellites. These satellites can be associated with the satellite ground stations near the user terminal at a certain time or at a certain position, and provide satellite communication services for the cell near the ground station.

In addition, the satellite ephemeris is recorded with the satellite number, orbit model, orbit inclination, and perigees per day of these satellites. This information can be used to determine the satellite ground station associated with each satellite at a certain time/position and the ground cell that provides satellite communication services.

Specifically, after acquiring the satellite ephemeris information, the user terminal may first determine the satellite ground station associated therewith based on the satellite ephemeris included in the satellite ephemeris information. Since the orbital period of a low-orbit satellite is about 1.5 to 2 hours, there may be multiple satellite ground stations associated with each low-orbit satellite when it orbits the earth. Therefore, the user terminal may also need to determine the satellite ground station serving the current cell or neighboring cells from a large number of satellite ground stations based on the current location information, and then determine at least one neighboring cell of the current serving cell based on the satellite ground station.

According to a solution of embodiments of the application, the satellite ephemeris information and current location information are acquired, and at least one neighboring cell of the current serving cell is determined according to the satellite ephemeris information and current location information; when the cell reselection is required, a target serving cell is selected from the at least one neighboring cell for cell reselection. According to the above solution, the current location information and satellite ephemeris information are utilized to determine the at least one neighboring cell of the current serving cell, thereby further reducing the range of neighboring cells determined based on satellite ephemeris information, and improving the accuracy and reliability of cell reselection. It can ensure that the cell reselected from the neighboring cells can be reselected for effectively providing desirable communication services for the UE while avoiding unnecessary cell reselection.

Figure 4:
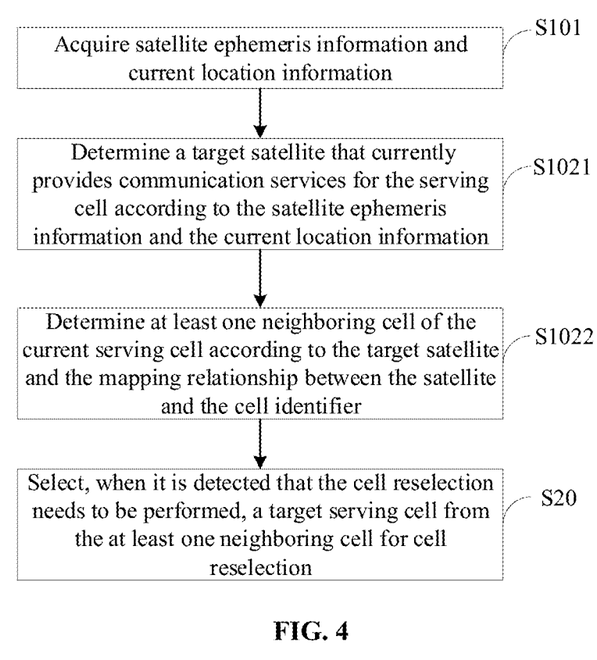
FIG. 4 is a schematic flowchart of the method for cell reselection based on ephemeris information according to some yet other embodiments of the application.

Referring to FIG. 4, FIG. 4 is a schematic flowchart of the method for cell reselection based on ephemeris information according to some other embodiments of the application. As shown in FIG. 4, the embodiments are based on the embodiment shown in FIG. 3 above, and the above step S102 further includes following steps S1021 to S1022.

In step S1021, a target satellite that currently provides communication services for the serving cell is determined according to the satellite ephemeris information and the current location information.

Specifically, some embodiments are based on following consideration. Although the cells served by each satellite at different times/locations may change, the satellite ground station corresponding to the current location area of the user terminal will not change frequently. Generally speaking, the area covered by a satellite ground station is much larger than the moving distance of the user terminal in a certain short period of time.

Therefore, in order to accurately determine the target satellite that provides communication services for the serving cell currently or subsequently, the user terminal may determine the satellite ground station corresponding to the serving cell according to the current location information; and then determine the target satellite currently associated with the satellite ground station according to the satellite ground station and the satellite ephemeris information.

A specific implementation may be as follows. The user terminal first determines its own location information, and then retrieves the name or number of the satellite ground station that provides satellite communication services for the current location based on the location information. Subsequently, the user terminal determines (the name or number of) satellite ground station associated with each satellite in the satellite ephemeris information based on the trajectory of satellite recorded in the satellite ephemeris information, and then screens out one or more candidate satellites from the satellites contained in the satellite ephemeris information through accurate matching.

After screening out the candidate satellites, the user terminal determines the docking time of these candidate satellites with the satellite ground station based on the satellite ephemeris information, and then determines, from the candidate satellites and in view of the current time, the target satellite that currently provides satellite communication services for the serving cell.

In step S1022, at least one neighboring cell of the current serving cell is determined according to the target satellite and the mapping relationship between the satellite and the cell identifier.

It should be noted that the satellite ephemeris information in some embodiments further includes the mapping relationship between cell identifiers of serving cells and the satellites (information), and each satellite corresponds to at least one cell identifier of a cell served by the satellite in the mapping relationship. For example, the cell identifiers corresponding to satellite 1 may be PCI1, PCI2, and PCI3, and the cell identifiers corresponding to satellite 2 may be PCI2, PCI3, and PCI4. Alternatively, under certain circumstances, one satellite may correspond to only one cell identifier.

In addition, in some embodiments, there are differences in the mapping relationship for different types of satellites, examples of which are given as follows.

For regeneration satellites, the mapping relationship is fixed. In other words, each satellite is fixedly associated with at least one certain cell identifier (e.g., PCI, ECGI);

For transparent satellites, the mapping relationship is variable. In other words, each satellite is associated with different cell identifiers (e.g., PCI, ECGI) at different times/locations. For example, the cell identifier associated with satellite 1 at time 1-position 1 is (PCI2), the cell identifier associated with time 2-position 1 is (PCI2, PCI3), and the cell identifier associated with time 2-position 2 is (PCI3). Therefore, for transparent satellites, when determining the neighboring cells of the current serving cell, it is to be implemented based on the current location and time of the satellite and the location information of the satellite ground station.

Specifically, after determining the target satellite, the user terminal may obtain the satellite type of the target satellite, and the satellite type includes the first satellite type (e.g., the above-mentioned regeneration satellite) and the second satellite type (e.g., the above-mentioned transparent satellite). When it is detected that the satellite type is the first satellite type, the operation of determining at least one neighboring cell of the current serving cell based on the target satellite and the mapping relationship between the satellites and the cell identifiers is performed.

As an implementation manner, when the user terminal detects that the satellite type is the second satellite type, it determines the satellite ground station corresponding to the serving cell according to the current location information; determines the satellite associated with the satellite ground station according to the satellite ground station and the satellite ephemeris information; and determines at least one neighboring cell of the current serving cell according to the satellite associated with the satellite ground station and the mapping relationship between the satellites and the cell identifiers.

According to the solution of embodiments of the application, the target satellite that currently provides communications service for the serving cell is determined according to the satellite ephemeris information and current location information, and at least one neighboring cell of the current serving cell is determined according to the target satellite and the mapping relationship between the satellites and the cell identifiers; when it is detected that the cell reselection is required, a target serving cell is selected from the at least one neighboring cell for cell reselection. According to the above solution, the current location information and satellite ephemeris information are utilized to determine the target satellite that currently provides communication services for the serving cell, and the neighboring cell is retrieved based on the target satellite in the mapping relationship between the satellites and the cell identifiers, thereby realizing accurate determination of the neighboring cell, and improving the reliability of cell reselection. It can ensure that, when the cell reselection is required by the user terminal, the cell reselected from the neighboring cells is able to effectively provide desirable communication services for the UE while avoiding unnecessary cell reselection.

The following uses a mobile phone as an example to describe the solution of the embodiments in detail through specific application scenarios.

For example, User A holds mobile phone X and moves westward from the current serving cell PCI1. Mobile phone X reads the satellite ephemeris information stored in the SIM card, and obtains the current location information through its integrated positioning module/device as (East longitude X°, North latitude Y°), determines, according to the latitude information in the current location information, that there are four satellite ground stations (a, b, c, d) at the same latitude, and then determines, according to the longitude information, that the satellite ground station currently providing communication services for the serving cell is c. Based on the pre-read satellite ephemeris information, the satellites associated with the satellite ground station c include satellite 1, satellite 2 and satellite 3. The mobile phone X determines, based on the current time and the satellite ephemeris of satellite 1, satellite 2, and satellite 3, that the target satellite docked with satellite ground station c at the current time is satellite 2. At the same time, it detects that the satellite type of satellite 2 is transparent satellite. Mobile phone X calculates that the satellite associated with satellite ground station c in five minutes later is satellite 3, and determines, based on the mapping relationship between satellites and cell IDs, that the cell IDs corresponding to satellite 2 include [PCI1, PCI2], and the cell IDs corresponding to satellite 3 include [PCI2, PCI3]. At this time, the mobile phone X may detect whether cell reselection is required. If yes, the cell corresponding to PCI2 or PCI3 can be determined as a neighboring cell, and then cell reselection is performed to ensure the stability of the channel quality.

In addition, embodiments of the present application also propose an apparatus for cell reselection based on ephemeris information. The apparatus for cell reselection based on ephemeris information includes a memory, a processor, and a program for cell reselection based on ephemeris information, wherein the program is stored in the memory and executable on the processor. The program for cell reselection based on ephemeris information is used for, when being executed by the processor, implementing the method for cell reselection based on ephemeris information as described above with reference to FIG. 1 to FIG. 4.

Since the program for cell reselection based on ephemeris information stored in the apparatus for cell reselection based on ephemeris information, when being executed by the processor, is able to implement the technical solutions according to all the foregoing embodiments, so it has at least all the beneficial effects brought by the technical solutions according to all the foregoing embodiments, which will not be repeated here.

In addition, embodiments of the present application also propose a computer-readable storage medium. The computer-readable storage medium stores thereon the program for cell reselection based on ephemeris information. The program for cell reselection based on ephemeris information is used for, when being executed by the processor, implementing the method for cell reselection based on ephemeris information as described above with reference to FIG. 1 to FIG. 4.

Since the program for cell reselection based on ephemeris information stored on the computer-readable storage medium, when being executed by the processor, is able to implement the technical solutions according to all the foregoing embodiments, so it has at least all the beneficial effects brought by the technical solutions according to all the foregoing embodiments, which will not be repeated here.

Compared with the prior art, in the method, apparatus and storage medium for cell reselection based on ephemeris information according to the embodiments of the application, the satellite ephemeris information is acquired, and at least one neighboring cell of the current serving cell is determined according to the satellite ephemeris information; when the cell reselection is required, a target serving cell is selected from the at least one neighboring cell for cell reselection. According to the above solution, the satellite ephemeris information is used to accurately calculate, predict, describe, and track the operating status, such as time, position, and speed, of the satellite/flying object, so as to determine the satellite that currently or subsequently provides services for the serving cell, thereby further determining at least one neighboring cell of the current serving cell. Even when the satellite moves at a high speed and the network topology changes rapidly, it can ensure that, when the UE needs to perform cell reselection, the cell reselected from the neighboring cells can be reselected for effectively providing desirable communication services for the UE while avoiding unnecessary cell reselection.

It should be noted that in this disclosure, the terms "comprise", "include" or any other variants thereof are intended to cover non-exclusive inclusion, so that a process, method, apparatus or system including a series of elements not only includes those elements, but also includes other elements that are not explicitly listed, or elements inherent to the process, method, apparatus, or system. Without restrictions, an element defined by a sentence "including a . . . " does not exclude the existence of other similar elements in the process, method, apparatus, or system that includes the element.

The serial numbers of the foregoing embodiments of the present application are only for description, and do not represent the superiority order of the embodiments.

Through the description of the above implementation manners, those skilled in the art can clearly understand that the above-mentioned method embodiments can be implemented by means of software plus the necessary general hardware platform. Alternatively, it can also be implemented by hardware, but in many cases the former implementation manner is better. Based on this understanding, the technical solution of this application essentially or the part that contributes to the existing technology can be embodied in the form of a software product, and the computer software product is stored in a storage medium, such as ROM/RAM, magnetic disc or an optical disc, which includes a number of instructions to enable a terminal device (e.g., a mobile phone, a computer, a server, a controlled terminal, a network device, and the like) to execute the method according to each embodiment of the present application.

The above are only preferred embodiments of the application, and do not limit the protection scope of the application. Any equivalent structure or equivalent process transformation made using the content of the description and drawings of the application, or directly or indirectly applied to other related technical fields, will fall within the protection scope of the application.

What is claimed is:

1. A method for cell reselection based on ephemeris information, comprising:
    acquiring, by a terminal device, satellite ephemeris information, and determining at least one neighboring cell of a current serving cell based on the satellite ephemeris information; and
    selecting, by the terminal device in response to determining that the cell reselection needs to be performed, a target serving cell from the at least one neighboring cell for the cell reselection,
    wherein the selecting, in response to determining that the cell reselection needs to be performed, the target serving cell from the at least one neighboring cell for the cell reselection comprises:
        performing, in response to determining that the cell reselection needs to be performed, channel quality measurement on the current serving cell to obtain first channel quality information;
        performing channel quality measurement on the at least one neighboring cell to obtain second channel quality information; and
        selecting, based on the first channel quality information and the second channel quality information, the target serving cell from the at least one neighboring cell for the cell reselection.

2. The method according to claim 1, wherein acquiring the satellite ephemeris information comprises:
    receiving the satellite ephemeris information sent by a serving base station through a dedicated signaling or a system broadcast signaling; or
    reading the satellite ephemeris information out from a pre-configuration of the terminal device.

3. The method according to claim 1, wherein the selecting, in response to determining that the cell reselection needs to be performed, the target serving cell from the at least one neighboring cell for the cell reselection further comprises:

performing, in response to determining that the cell reselection needs to be performed, channel quality measurement on the at least one neighboring cell, and selecting the target serving cell from the at least one neighboring cell for cell reselection based on a measurement result.

4. The method according to claim 1, wherein the acquiring the satellite ephemeris information, and determining the at least one neighboring cell of the current serving cell based on the satellite ephemeris information comprises:
acquiring the satellite ephemeris information and current location information of the terminal device; and
determining the at least one neighboring cell of the current serving cell based on the satellite ephemeris information and the current location information.

5. The method according to claim 4, wherein the current location information comprises: a related identifier of the current serving cell and/or a current location of a user equipment (UE).

6. The method according to claim 4, wherein the determining the at least one neighboring cell of the current serving cell based on the satellite ephemeris information and the current location information comprises:
determining, based on the satellite ephemeris information and the current location information, a target satellite currently providing communication services for the current serving cell; and
determining the at least one neighboring cell of the current serving cell based on the target satellite and a mapping relationship between satellites and cell identifiers.

7. The method according to claim 6, wherein the determining, based on the satellite ephemeris information and the current location information, the target satellite currently providing communication services for the current serving cell comprises:
determining a satellite ground station corresponding to the current serving cell based on the current location information; and
determining the target satellite currently associated with the satellite ground station based on the satellite ground station and the satellite ephemeris information.

8. The method according to claim 6, further comprising:
acquiring a satellite type of the target satellite, wherein the satellite type comprises a first satellite type and a second satellite type.

9. The method according to claim 8, further comprising:
performing, in response to detecting that the satellite type is the first satellite type, the determining the at least one neighboring cell of the current serving cell based on the target satellite and the mapping relationship between satellites and cell identifiers.

10. The method according to claim 8, further comprising:
determining, in response to detecting that the satellite type is the second satellite type, a satellite ground station corresponding to the current serving cell based on the current location information; and
the determining the at least one neighboring cell of the current serving cell based on the target satellite and the mapping relationship between satellites and cell identifiers comprises:
determining a satellite associated with the satellite ground station based on the satellite ground station and the satellite ephemeris information; and
determining the at least one neighboring cell of the current serving cell based on the satellite associated with the satellite ground station and the mapping relationship between satellites and cell identifiers.

11. The method according to claim 4, further comprising:
calculating a first distance from the terminal device to a center position of the current serving cell based on the current location information; and
determining whether the cell reselection needs to be performed based on the first distance.

12. The method according to claim 11, wherein the determining whether the cell reselection needs to be performed based on the first distance comprises:
calculating a second distance from the terminal device to a center position of the at least one neighboring cell based on the current location information; and
determining whether the cell reselection needs to be performed based on the first distance and the second distance.

13. The method according to claim 12, wherein the determining whether the cell reselection needs to be performed based on the first distance and the second distance comprises:
calculating a difference between the first distance and the second distance; and
determining whether the cell reselection needs to be performed based on the difference.

14. The method according to claim 13, wherein the determining whether the cell reselection needs to be performed based on the difference comprises:
starting, in response to determining that the difference exceeds a first threshold, a timing, and determining, based on a result of the timing, whether a duration of the difference exceeding the first threshold is greater than a preset duration;
detecting, in response to determining that the duration is greater than the preset duration, whether a difference changing value corresponding to the difference within the duration is greater than a second threshold; and
determining, in response to detecting that the difference changing value is greater than the second threshold, the cell reselection needs to be performed.

15. A terminal device, comprising:
a memory, a processor, and a program stored in the memory;
wherein when the program is executed by the processor, the processor implements steps comprising:
acquiring satellite ephemeris information, and determining at least one neighboring cell of a current serving cell based on the satellite ephemeris information; and
selecting, in response to determining that cell reselection needs to be performed, a target serving cell from the at least one neighboring cell for the cell reselection,
wherein the selecting, in response to determining that the cell reselection needs to be performed, the target serving cell from the at least one neighboring cell for the cell reselection comprises:
performing, in response to determining that the cell reselection needs to be performed, channel quality measurement on the current serving cell to obtain first channel quality information;
performing channel quality measurement on the at least one neighboring cell to obtain second channel quality information; and
selecting, based on the first channel quality information and the second channel quality information, the target serving cell from the at least one neighboring cell for the cell reselection.

16. A non-transitory computer-readable storage medium storing a program, the program including instructions, which when executed by a processor, performs steps comprising:
   acquiring satellite ephemeris information, and determining at least one neighboring cell of a current serving cell based on the satellite ephemeris information; and
   selecting, in response to determining that cell reselection needs to be performed, a target serving cell from the at least one neighboring cell for the cell reselection,
   wherein the selecting, in response to determining that the cell reselection needs to be performed, the target serving cell from the at least one neighboring cell for the cell reselection comprises:
      performing, in response to determining that the cell reselection needs to be performed, channel quality measurement on the current serving cell to obtain first channel quality information;
      performing channel quality measurement on the at least one neighboring cell to obtain second channel quality information; and
      selecting, based on the first channel quality information and the second channel quality information, the target serving cell from the at least one neighboring cell for the cell reselection.

* * * * *